(No Model.)
J. B. H. LEONARD.
Manufacture of Handles for Cutlery from Vulcanized Fiber.
No. 237,440.  Patented Feb. 8, 1881.
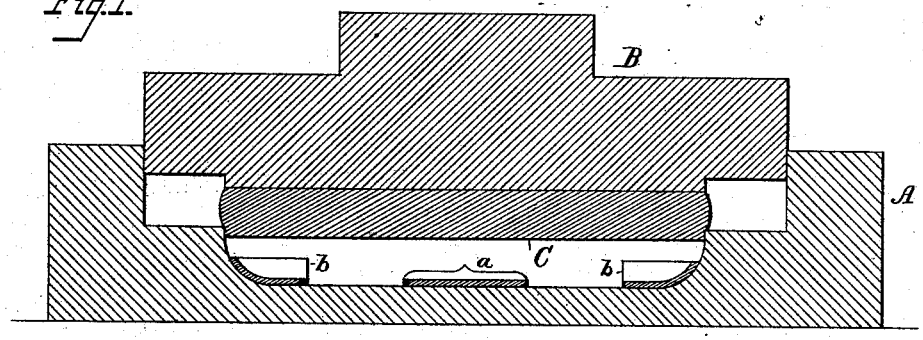
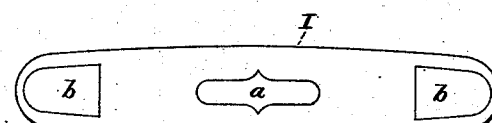
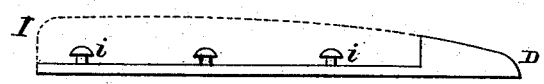
Attest:
Courtney A. Cooper
J. W. McCleary
Jno. B. H. Leonard
By his Attorney
Charles E. Foster

UNITED STATES PATENT OFFICE.

JOHN B. H. LEONARD, OF BRIDGEPORT, CONNECTICUT, ASSIGNOR TO FREDERICK A. BLACK, OF NEW YORK, N. Y.

MANUFACTURE OF HANDLES FOR CUTLERY FROM VULCANIZED FIBER.

SPECIFICATION forming part of Letters Patent No. 237,440, dated February 8, 1881.

Application filed August 6, 1880. (No model.)

*To all whom it may concern:*

Be it known that I, JOHN B. H. LEONARD, of Bridgeport, Fairfield county, Connecticut, have invented an Improvement in the Manufacture of Handles for Cutlery from Vulcanized Fiber, of which the following is the specification.

The object of my invention is to provide handles for clasp and other knives and other articles of cutlery, that shall be cheap, strong, easily ornamented, capable of ready attachment to the metallic portions of the knife, and which shall not be affected by liquids liable to be brought in contact with the knife in its ordinary use.

Of the various materials—such as bone, horn, rubber, wood, and metal—which have been used for the handles or scales of knives, razors, &c., some are excessively heavy, others expensive to form into shape, others are liable to be broken in attaching to the blades, and others are lacking in strength and durability and are injuriously affected by liquids liable to be brought in contact with the knife.

After many experiments with various articles I have ascertained that what is known as "vulcanized fiber"—a preparation having paper as a basis—when properly manipulated and operated upon, may be formed into scales and handles possessing nearly every quality necessary for such articles.

In producing a handle I take a block or sheet of vulcanized fiber approximating but larger in size than the desired article, and, placing it between dies properly shaped, I subject it to heavy pressure until it is condensed, forced into and completely fills the recess in the dies, and conforms to the shape thereof. The piece is then removed, drilled, or cut, as may be necessary for the attachment of the blade, and is then polished.

I have found that by subjecting the material to a pressure for a sufficient length of time it becomes so set in shape that it will retain under all circumstances the form thus imparted, and that by compressing a block somewhat larger than the article into a smaller compass the material is so condensed that its strength and durability and capacity to receive a high polish are materially improved.

By this mode of manufacture the handles may not only be formed, but they may also be highly ornamented simply by the art of shaping, by merely embossing the dies according to the desired ornamentation.

One of the most expensive and difficult operations connected with the manufacture of cutlery is the insertion of the metallic shields, medallions, or tips which ornament or strengthen the same, it being necessary to saw or chisel away the material to a shape conforming to the piece to be inserted, and to then cement the latter into its place, and in very many instances the fitting is imperfect and the piece becomes detached. I discard these operations in connection with the material named by placing the tip or other piece in the die or mold directly upon the face of the same, and then compress the block of fiber into the mold, as before described, in contact with said pieces, which thus become embedded in the material in the act of forming the latter without any additional operations, and are secured much more firmly and neatly than by any process of fitting heretofore devised.

Figure 1 is a sectional view of the die and mold with the material between them. Fig. 2 is a side view of the scale after compression, and Fig. 3 is a view of the lining.

The shield *a* and end pieces, *b b*, may be placed in the recess of the lower die, A. The block C of vulcanized fiber is placed in said recess, and the upper die, B, brought downward with a powerful pressure, when the material will be compressed and shaped, and the pieces *a b* will be embedded therein, forming a scale, I, with inserted pieces, as shown in Fig. 2. In like manner the scale I (dotted lines Fig. 3) may be secured to one of the linings D by compressing the material upon and around projecting pins or studs *i* of the lining.

My invention must be distinguished from that mode of manufacturing such articles which consists in applying a pasty composition in a mold or to a metal lining or blade and then hardening the same, this requiring a degree of heat which detracts from the temper of the blade or interferes otherwise with the quality of the article. The manipulation is furthermore troublesome and expensive, while the above-described mode of manufacture, requiring only pressure between cold dies, can be effected at a minimum of labor and expense.

I claim—

1. The mode described of forming handles for cutlery, the same consisting in reducing a block or sheet of vulcanized fiber to a form approximating but larger than the article to be formed, and then condensing and molding the same under a heavy pressure, substantially as set forth.

2. In the manufacture of handles for cutlery, subjecting the material forming the handle to pressure between dies in contact with metallic pieces to be connected thereto, substantially as set forth.

3. As a new article of manufacture, a handle for cutlery, consisting of a compressed and molded block of vulcanized fiber, formed and adapted for the attachment to the blade as described.

In testimony whereof I have signed my name to this specification in the presence of two subscribing witnesses.

JOHN B. H. LEONARD.

Witnesses:
CHARLES E. FOSTER,
R. E. PARSNER.